US006157991A

United States Patent [19]

Arnon

[11] Patent Number: 6,157,991

[45] Date of Patent: Dec. 5, 2000

[54] METHOD AND APPARATUS FOR ASYNCHRONOUSLY UPDATING A MIRROR OF A SOURCE DEVICE

[75] Inventor: Dan Arnon, Boston, Mass.

[73] Assignee: EMC Corporation, Hopkinton, Mass.

[21] Appl. No.: 09/053,420

[22] Filed: Apr. 1, 1998

[51] Int. Cl.[7] .................................................... G06F 12/16

[52] U.S. Cl. ............................................ 711/161; 711/162

[58] Field of Search ................................ 714/5, 7, 10, 11, 714/12, 13, 220; 700/79, 82; 707/8, 201, 202, 204; 711/161, 162, 112, 113, 114, 165

[56] References Cited

U.S. PATENT DOCUMENTS

| | | | |
|---|---|---|---|
| 5,379,418 | 1/1995 | Shimazaki et al. | 714/11 |
| 5,504,861 | 4/1996 | Crockett et al. | 714/13 |
| 5,544,347 | 8/1996 | Yanai et al. | 711/162 |
| 5,870,537 | 2/1999 | Kern et al. | 711/162 |

FOREIGN PATENT DOCUMENTS

| | | |
|---|---|---|
| WO 94/25919 | 11/1994 | WIPO . |
| WO 97/35269 | 9/1997 | WIPO . |

OTHER PUBLICATIONS

PCT International Search Report for PCT/US99/06719 completed Jul. 30, 1999.

*Primary Examiner*—Do Hyun Yoo
*Assistant Examiner*—Yamir Encarnacion
*Attorney, Agent, or Firm*—Wolf, Greenfield & Sacks, P.C.

[57] ABSTRACT

In a computer system including a CPU, a first storage system coupled to the CPU, a second storage system, and a communication link coupling the second storage system to the first storage system, a method and apparatus for asynchronously mirroring, to the second storage system, a plurality of units of data written by the CPU to the first storage system. In one aspect of the invention, the CPU writes units of data to the first storage system in a first order, and the units of data are asynchronously transmitted over the communication link from the first storage system to the second storage system in a second order that is different than the first order. In another aspect, the units of data are committed in the second storage system in an order that is independent of the order in which the units of data are received at the second storage system. In a further aspect of the invention, a packet of information is transmitted over the communication link to the target storage system to specify a commitment order in which the units of data should be committed in the target storage system. In another aspect of the invention, a single copy of each of the units of data is written into the first storage device, without buffering a copy to support asynchronous mirroring. In a further aspect, the storage locations in the first storage system are organized into a plurality of consistency sets, and the units of data are asynchronously transmitted over the communication link so that each consistency set has a representation in the second storage system that is consistent with a valid representation of the consistency set in the first storage system at some point in time.

83 Claims, 5 Drawing Sheets

30

| LOGICAL VOLUME | TRACK | RDF COMMITMENT PENDING | PACKET PENDING | CONSISTENCY SET |
|---|---|---|---|---|
| 0 | 0 | Y | N | 5 |
| 0 | 1 | N | NA | 2 |
| ⋮ | ⋮ | ⋮ | | ⋮ |
| 100 | 100 | Y | Y | 5 |

*FIG. 3*

METHOD AND APPARATUS FOR ASYNCHRONOUSLY UPDATING A MIRROR OF A SOURCE DEVICE

FIELD OF THE INVENTION

The present invention is directed to a method and apparatus for asynchronously updating a mirroring target device.

DESCRIPTION OF THE RELATED ART

A number of computer system configurations mirror information stored on a source storage device to a target storage device that can be disposed at a location remote from the source device. One illustrative example of such a system is a remote mirroring data facility (RDF) discussed below in connection with FIG. 1.

In the system shown in FIG. 1, a host CPU 1 is coupled to a source storage system 6 that includes a source storage device 3 and storage controller 5. The source storage device 3 may be a large disc drive providing main storage for the host CPU 1, or it may be a plurality of smaller disc drives arranged to perform the same function. An example of a storage system including a plurality of disc drives is the SYMMETRIX line of disc arrays available from EMC Corporation, Hopkinton, Mass. The data stored on storage device 3 may be crucial to the operation of host CPU 1. Therefore, a contingency solution is desirable in the event that a problem is experienced with storage device 3 to ensure that the stored data is not lost, and to minimize the risk of CPU 1 being down due to problems with the storage device. Potential problems with storage device 3 can include hardware and software errors that may make stored data unrecoverable, as well as catastrophic events such as an earthquake or other natural disaster that could result in the destruction of the storage device 3.

One solution for protecting the data stored in storage device 3 is to mirror the data in another storage device. FIG. 1 illustrates such a system, wherein the source storage system 6 is coupled to a target storage system 8 that includes a target storage controller 7 and an associated target storage device 9. As data is written to storage device 3, it can also be mirrored to storage device 9. If storage device 3 is destroyed or experiences an error that renders stored data unrecoverable, the data can be retrieved from the mirroring target storage device 9. As shown in FIG. 1, the target system 8 can also serve as the main storage system for another host CPU 11. Alternatively, the storage system can be dedicated solely to mirroring the data stored in the source storage system without being coupled to another CPU. An example of a remote data facility as shown in FIG. 1 is described in U.S. Pat. No. 5,544,347 (Yanai), which is assigned to the assignee of the present application.

To provide enhanced protection in the event of a natural disaster, and to provide flexibility in the configuration of the system, the target storage system 8 may be disposed a relatively long distance away from the source storage system 6. Thus, a relatively long distance link 13 may be provided to couple together the source and target storage controllers 5 and 7. As is discussed in the assignee's co-pending U.S. patent application Ser. No. 08/918,238, entitled METHOD AND APPARATUS FOR INTERFACING TWO REMOTELY DISPOSED DEVICES COUPLED VIA A TRANSMISSION MEDIUM, which is incorporated herein by reference, the link 13 between the source and target storage controllers 5 and 7 can be implemented using multiple communication links 13*a* and 13*b* that transmit information between the source and target storage controllers in parallel. As further discussed in that co-pending application, when the source and target storage controllers are disposed a relatively long distance apart, the propagation delay through the links 13*a* and 13*b* can become substantial. This can have a significant impact on the performance of the RDF system, depending upon the mode in which the system operates.

As discussed in U.S. Pat. No. 5,544,347, a remote data facility as shown in FIG. 1 can be operated in either a synchronous mode or an asynchronous mode. The primary difference between these modes of operation relates to the manner in which command chains received from the host CPU 1 are "committed" to the storage systems. A chain is an operation between the host CPU 1 and source storage system 6 wherein the host sees only a single status back for the operation. The CPU 1 does not consider the operation to have been completed successfully until it receives an indication from the source storage system 6 that the command chain has been committed (i.e., processed successfully by the storage system 6). Each command chain can include one or more commands directed to a particular logical volume. A logical volume is a unit of information that is mapped to one or more blocks of physical storage space on the source storage device 3.

When operating in the synchronous mode, the host CPU 1 does not consider an operation specified by a command chain to be completed until the command chain has been committed to both the source and target storage systems 6 and 8. Thus, in synchronous mode, for a chain of commands that implements one or more writes, the source storage system 6 will not provide an indication to the host CPU 1 that the chain of commands is committed until the data is successfully written (either to the storage devices 3, 9 or a temporary storage space such as a cache) in both storage systems 6, 8.

It should be appreciated that when a remote data facility such as the one shown in FIG. 1 operates in synchronous mode, it provides maximum protection for the information written from the host CPU 1, because the CPU 1 will not recognize any chain of commands as having completed successfully (i.e., as being committed) until all data written thereby is stored in two places, i.e., in the source storage system 6 and the target storage system 8. However, the cost paid for this increased protection is that all command chains issued from the host CPU 1 that write data to the storage system 6 are impacted by the propagation delay through the links 13*a* and 13*b*.

To address the performance impact of operating in synchronous mode, it has been proposed to implement a remote data facility as shown in FIG. 1 in an asynchronous mode, wherein the RDF system commits a command chain executed by host CPU 1 as soon as the information written thereby is stored in the source storage system 6, without waiting for that information to be transferred across the links 13*a* and 13*b* to the target storage system 8. Thereafter, in a manner transparent to host CPU 1, the RDF system asynchronously transfers the updated information from the source storage system 6 to the target storage system 8.

SUMMARY OF THE INVENTION

One illustrative embodiment of the invention is directed to a method for use in a computer system including a central processing unit (CPU), a first storage system that is coupled to the CPU, a second storage system, and a communication link coupling the second storage system to the first storage system, wherein the CPU writes units of data to the first storage system in a first order. The method asynchronously mirrors, to the second storage system, a plurality of units of data written by the CPU to the first storage system. The method comprises steps of: (A) storing the units of data in the first storage system; and (B) asynchronously transmitting the units of data over the communication link from the first storage system to the second storage system in a second order that is different than the first order.

Another illustrative embodiment of the invention is directed to a source storage system for use in a computer system including a central processing unit (CPU) coupled to the source storage system, a target storage system, and a communication link coupling the target storage system to the source storage system, wherein the CPU writes a plurality of units of data to the source storage system in a first order. The source storage system includes at least one storage device that includes a plurality of storage locations; and at least one controller that stores the units of data written by the CPU to the at least one storage device and mirrors at least some of the plurality of units of data written to the at least one storage device to the target storage system. The at least one controller asynchronously transmits the at least some of the units of data over the communication link from the source storage system to the target storage system in a second order that is different than the first order in which the some of the units of data are written from the CPU to the source storage system.

A further illustrative embodiment of the invention is directed to a method for use in a computer system including a central processing unit (CPU), a first storage system that is coupled to the CPU, a second storage system, and a communication link coupling the second storage system to the first storage system. The method mirrors, to the second storage system, a plurality of units of data written by the CPU to the first storage system. The method comprises steps of: (A) storing the units of data in the first storage system; (B) transmitting the units of data over the communication link from the first storage system to the second storage system in a first order; and (C) committing the units of data in the second storage system in a second order that is independent of the order in which the units of data are received at the second storage system.

Another illustrative embodiment of the invention is directed to a target storage system for use in a computer system including a central processing unit (CPU), a source storage system coupled to the CPU, and a communication link that couples the target storage system to the source storage system, wherein the source storage system transmits over the communication link to the target storage system a plurality of units of data written by the CPU to the source storage system. The target storage system receives the units of data over the communication link in a first order. The target storage system includes at least one storage device that includes a plurality of storage locations; and at least one controller that commits the units of data received over the communication link from the source storage system to the at least one storage device in a second order that is independent of the first order in which the units of data are received at the target storage system.

A further illustrative embodiment of the invention is directed to a source storage system for use in a computer system including a central processing unit (CPU) coupled to the source storage system, a target storage system, and a communication link that couples the target storage system to the source storage system, wherein the CPU writes a plurality of units of data to the source storage system. The source storage system includes at least one storage device that includes a plurality of storage locations; and at least one controller that stores the units of data written by the CPU to the at least one storage device and mirrors at least some of the plurality of units of data to the target storage system. The at least one controller transmits the at least some of the units of data over the communication link to the target storage system in a transmission order, and transmits at least one packet of information over the communication link to the target storage system, the at least one packet specifying a commitment order in which the at least some of the plurality of units of data should be committed in the target storage system independent of the transmission order.

Another illustrative embodiment of the invention is directed to a method for use in a computer system including a central processing unit (CPU), a first storage system that is coupled to the CPU and includes a plurality of storage locations, a second storage system, and a communication link coupling the second storage system to the first storage system. The first storage system includes a cache and at least one storage device that includes the plurality of storage locations. The method asynchronously mirrors, to the second storage system, a plurality of units of data written by the CPU to at least some of the plurality of storage locations in the first storage system. The method comprises steps of: (A) storing a single copy of each of the plurality of units of data directly into the cache without buffering a copy of each unit of data in a queue to support asynchronous mirroring; and (B) asynchronously transmitting each of the plurality of units of data over the communication link from the first storage system to the second storage system.

A further illustrative embodiment of the invention is directed to a source storage system for use in a computer system including a central processing unit (CPU) coupled to the source storage system, a target storage system, and a communication link that couples the target storage system to the source storage system. The source storage system includes at least one storage device that includes a plurality of storage locations; a cache having a plurality of cache locations that correspond to a subset of the plurality of storage locations; and at least one controller that asynchronously mirrors, to the target storage system, a plurality of units of data written by the CPU to at least some of the plurality of storage locations. The at least one controller stores a single copy of each of the plurality of units of data directly into the cache without buffering a copy of each of the plurality of units of data in a queue to support asynchronous mirroring, and asynchronously transmits each of the plurality of units of data over the communication link from the first storage system to the second storage system.

A further illustrative embodiment of the invention is directed to a method for use in a computer system including a central processing unit (CPU), a first storage system that is coupled to the CPU, a second storage system, and a communication link coupling the second storage system to the first storage system. The method asynchronously mirrors, to the second storage system, a plurality of units of data written by the CPU to at least some of the plurality of storage locations in the first storage system. The method comprises steps of: (A) organizing the plurality of storage locations into a plurality of consistency sets of storage locations; and (B) asynchronously transmitting the plurality of units of data over the communication link from the first storage system to the second storage system so that each consistency set of storage locations has a representation in the second storage system that is consistent with a valid representation of the consistency set of storage locations in the first storage system at some point in time.

A further illustrative embodiment of the invention is directed to a source storage system for use in a computer system including a central processing unit (CPU) coupled to the source storage system, a target storage system, and a communication link that couples the target storage system to the source storage system. The source storage system includes at least one storage device that includes a plurality of storage locations; and at least one controller that organizes the plurality of storage locations into a plurality of consistency sets of storage locations and that asynchronously mirrors, to the target storage system, a plurality of units of data written by the CPU to at least some of the plurality of storage locations. The at least one controller asynchronously transmits the plurality of units of data over the communication link from the source storage system to the target storage system so that each consistency set of storage locations has a representation in the target storage system that is consistent with a valid representation of the consistency set of storage locations in the source storage system at some point in time.

DETAILED DESCRIPTION OF THE DRAWINGS

FIG. 3 is one illustrative example of a table for determining potential overwrites of data not yet committed to a target mirroring device in accordance with one illustrative embodiment of the invention;

Figure 4:
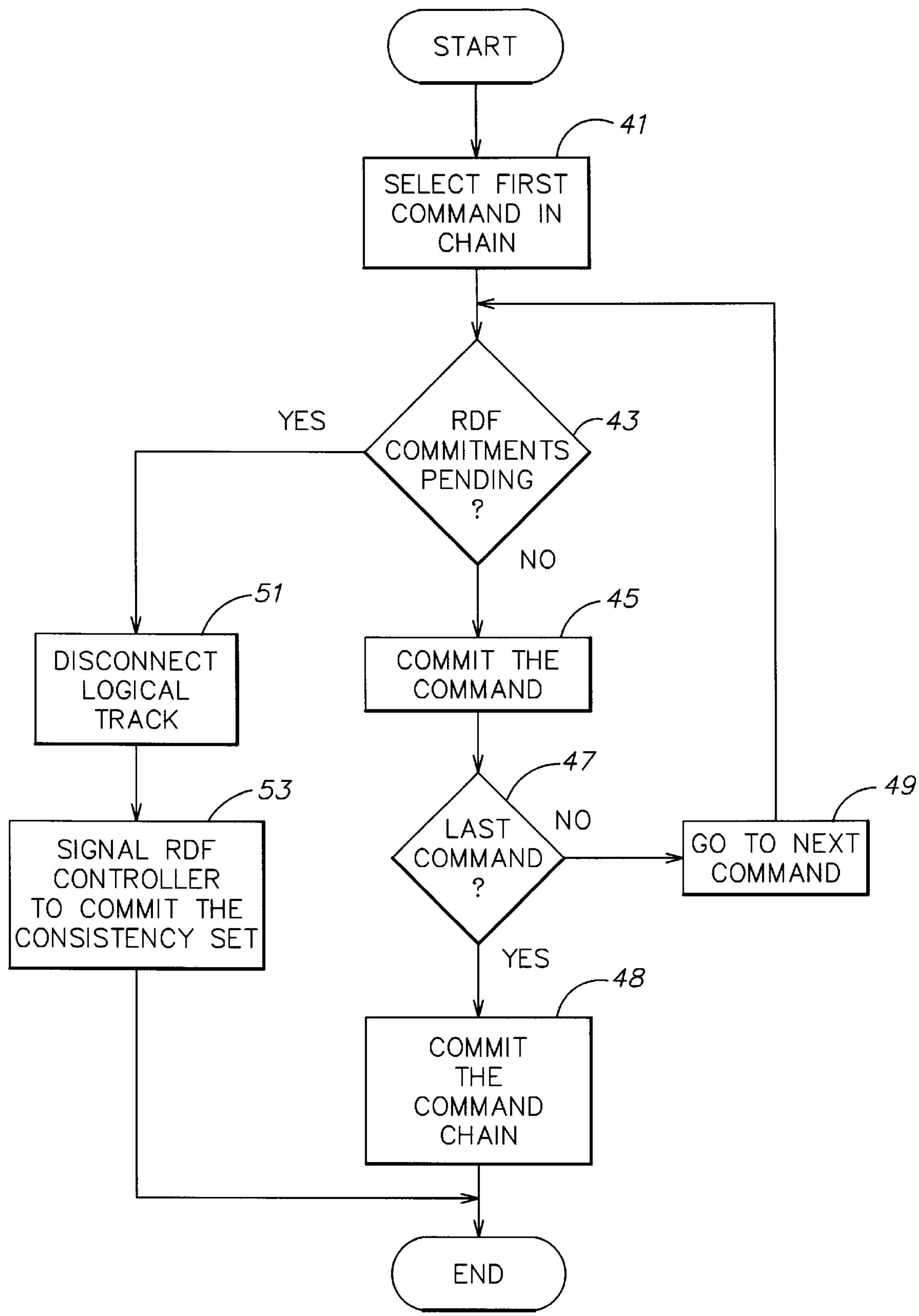
Figure 5:
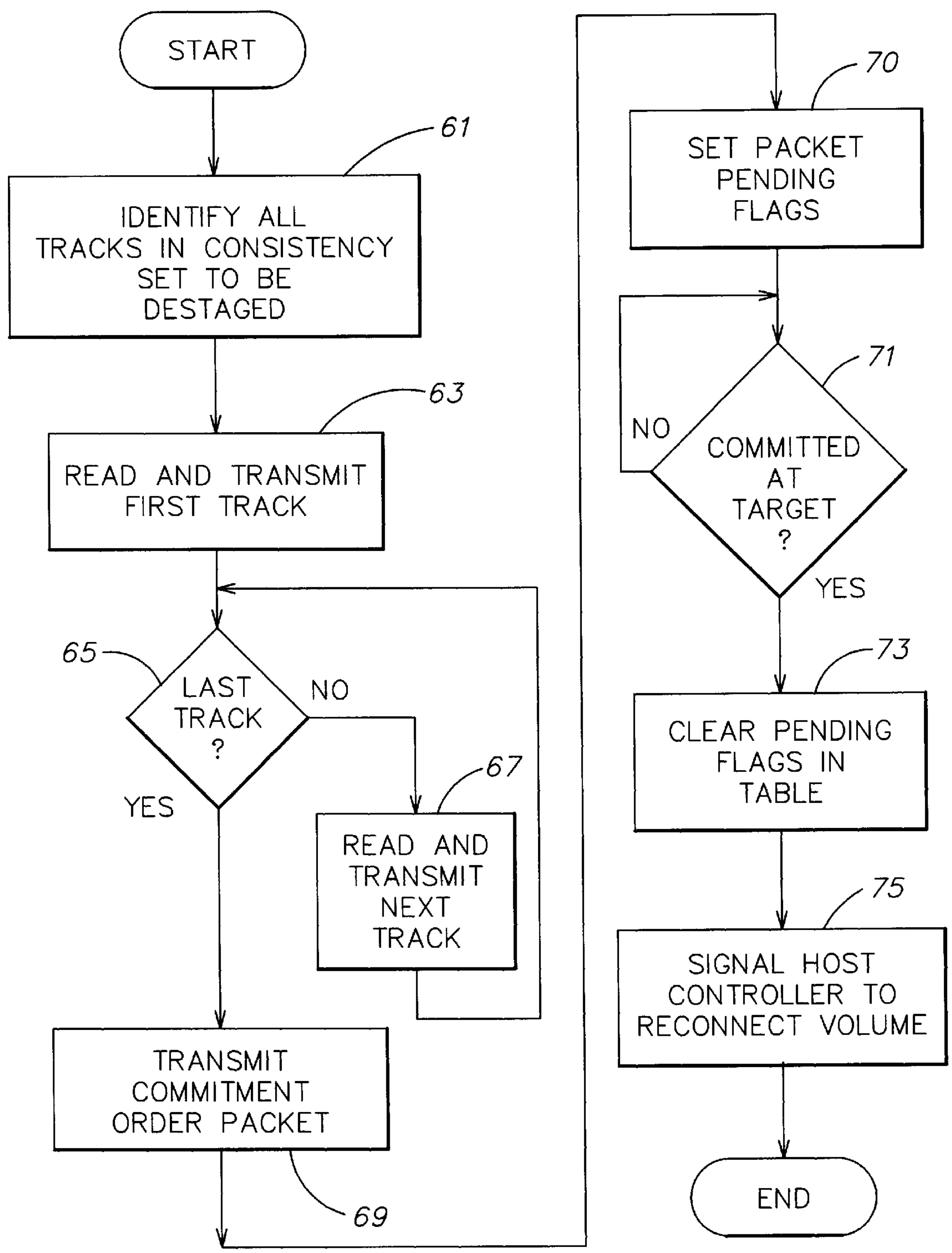

FIG. 4 is a flowchart of one illustrative routine executed by a storage controller in response to the receipt of a new command chain in accordance with one illustrative embodiment of the invention; and FIG. 5 is a flowchart of one illustrative implementation of a routine executed by a source storage system controller in response to a write to a location including updated data that has not yet been committed to the target storage system in accordance with one illustrative embodiment of the invention.

DETAILED DESCRIPTION

Figure 1:
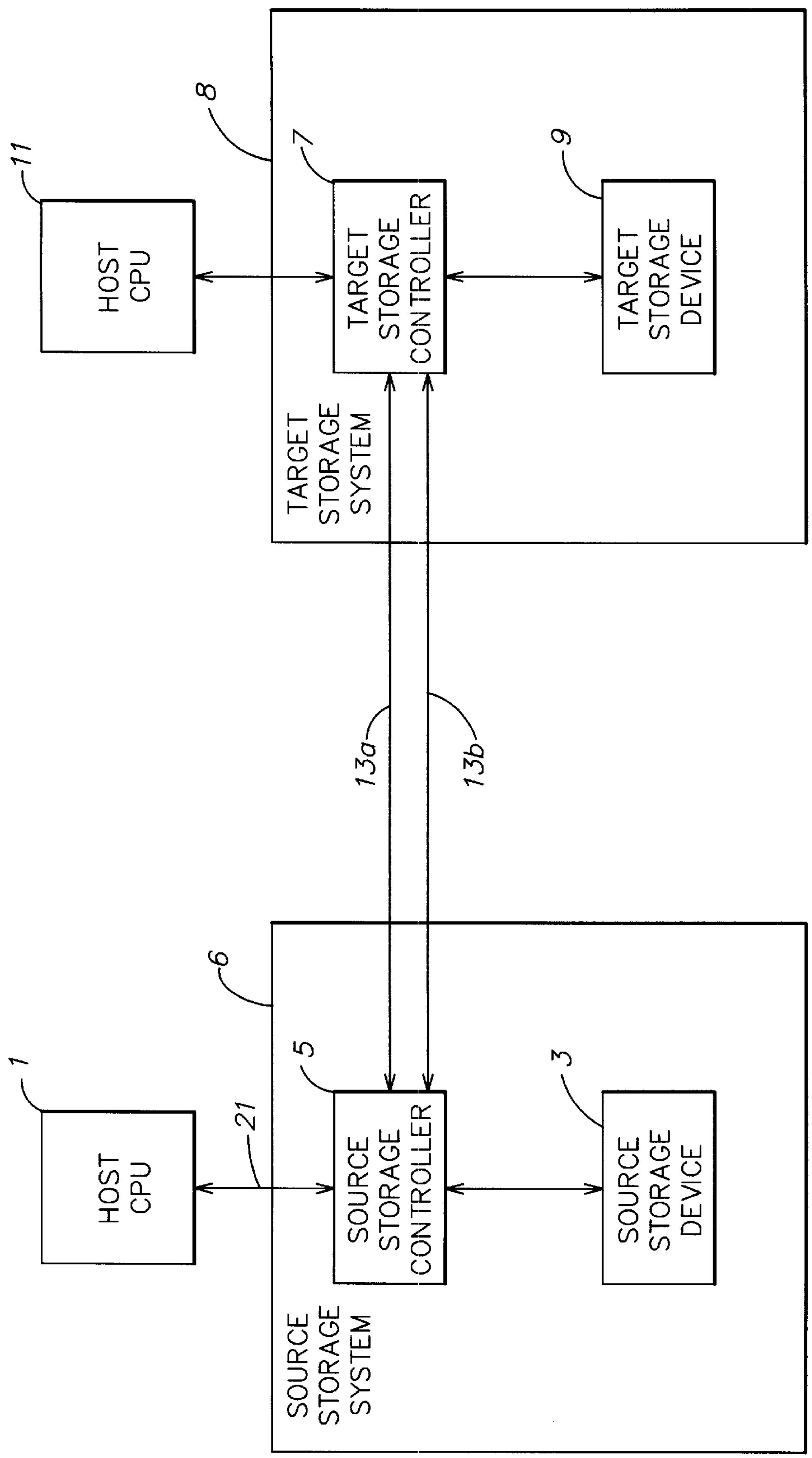
FIG. 1 is an illustrative example of a remote mirroring data facility on which aspects of the present invention can be employed.

The present invention is directed to a method and apparatus for asynchronously updating a mirroring target storage device from a source storage device. One illustrative example of an application in which the present invention can be used is a remote mirroring data facility as discussed in detail below. However, it should be appreciated that the present invention can be employed in numerous other applications and system configurations, and is not limited to use in a remote mirroring data facility. For example, in some network configurations, it may be desirable to provide a mirrored copy of a storage device. The present invention can be used in such a network application to provide asynchronous mirroring. Thus, although one illustrative embodiment of the present invention is described below in connection with an RDF system as shown in FIG. 1, the present invention is not limited to such an application.

One possible technique for asynchronously updating the target storage system 8 from the source storage system 6 is to initially commit writes to appropriate locations in the storage unit 6, and to subsequently, with some time delay, copy the updates to the target storage system 8. However, a simple example illustrates the disadvantage in employing such a technique. For the purpose of this example, each write from the host CPU 1 to the source storage system 6 is performed on a track of information within a logical volume. In this example, a track designates the minimum amount of information operated upon by the host CPU 1. As will be appreciated by those skilled in the art, the logical volumes and tracks referenced by the CPU 1 do not necessarily respectively map directly to physical devices (e.g., disc drives) and tracks thereon in the source storage device 3. Rather, each logical volume may map to multiple physical devices, or multiple logical volumes may map to the same physical device. Similarly, each logical track does not necessarily map to a track on any physical device, and may map to physical locations that are spread across multiple tracks or devices. Although the examples described below relate to commands operating on logical tracks of information, it should be appreciated that the present invention is not limited in this respect, and that the present invention can be employed in systems wherein other units of information are employed by the commands issued from the host CPU 1.

In this simple example, a sequence of three command chains is executed on host CPU 1, with each chain including a single command that writes information to the source storage system 6. A first command chain executes a write of data "A" to track T1 on logical volume LV1, a second chain executes a write of some data to track T2 on logical volume LV4, and a third chain executes a write of data "B" to track T1 on LV1. If, for example, a simple two chain delay were employed in asynchronously updating the target storage system 8, such that after a two chain delay the previously updated information was asynchronously transferred to the target storage system 8, some of the information written to the source storage system 6 would be lost. Referring to the specific example of chains above, if a two chain delay were imposed in an attempt to asynchronously destage the write of data "A" to LV1/T1, by the time the information on LV1/T1 was copied to the target storage system 8, the data "A" would have been overwritten with data "B". Therefore, if this simple technique were employed, the information mirrored to the target storage system 8 would not be consistent with that which was written to the source storage system 6.

According to one illustrative embodiment of the invention, a technique is employed to ensure that the target storage system 8 is updated in a manner consistent with the source storage system 6. Thus, although each logical unit of information in the target storage system 8 is not a real time copy of the corresponding logical unit in the source storage system 6 that it mirrors, it does provide a copy of its mirrored logical unit that is consistent with a valid state of that logical unit at some point in time. In one embodiment of the invention, this consistency is maintained for each logical volume stored on the source storage system. However, it should be appreciated that the present invention is not limited in this respect, and that the granularity of the logical unit on which consistency is maintained can differ.

One possibility for asynchronously updating the logical volumes on the target storage system 8 in a manner that maintains a consistent (although not real-time) picture of the corresponding volumes in the source storage system 6 is to queue the command chains (including the data written thereby) issued from the host CPU 1 to the source storage system 6. Referring to the example above, in such an implementation the third command chain that writes data "B" to LV1/T1 would still be committed immediately to LV1/T1 in the source storage device 3, but the entire string of command chains would also be stored in a queue, such that the earlier write of data "A" to LV1/T1 would be preserved. In this manner, the updates to the logical volumes in the target storage system 8 would occur based upon the information in the queue of command chains, rather than directly from the data stored in the source storage device 3. Although implementing the asynchronous mode in this manner would provide for a consistent mirroring on the target storage system 8, it would require a significant amount of resources. In particular, it should be appreciated that each command chain can include a lengthy series of commands, and can write a significant amount of data to the source storage device 3. Therefore, it would take a significant amount of storage resources and control to support a queuing of the strings of command chains that can be transmitted from the host CPU 1 to the source storage system 6.

In one illustrative embodiment of invention, a method and apparatus for asynchronously updating logical units of information on the target storage system 8 is employed that provides the most advantageous features of the two alternate implementations discussed above. In particular, for a set of logical volumes that are connected in a single logical set for which consistent mirroring is desired, this illustrative embodiment of the present invention provides such mirroring on the target storage system 8. However, this result is achieved without requiring significant hardware resources, or the queuing of a series of command chains and associated data in the source storage system 6.

Figure 2:
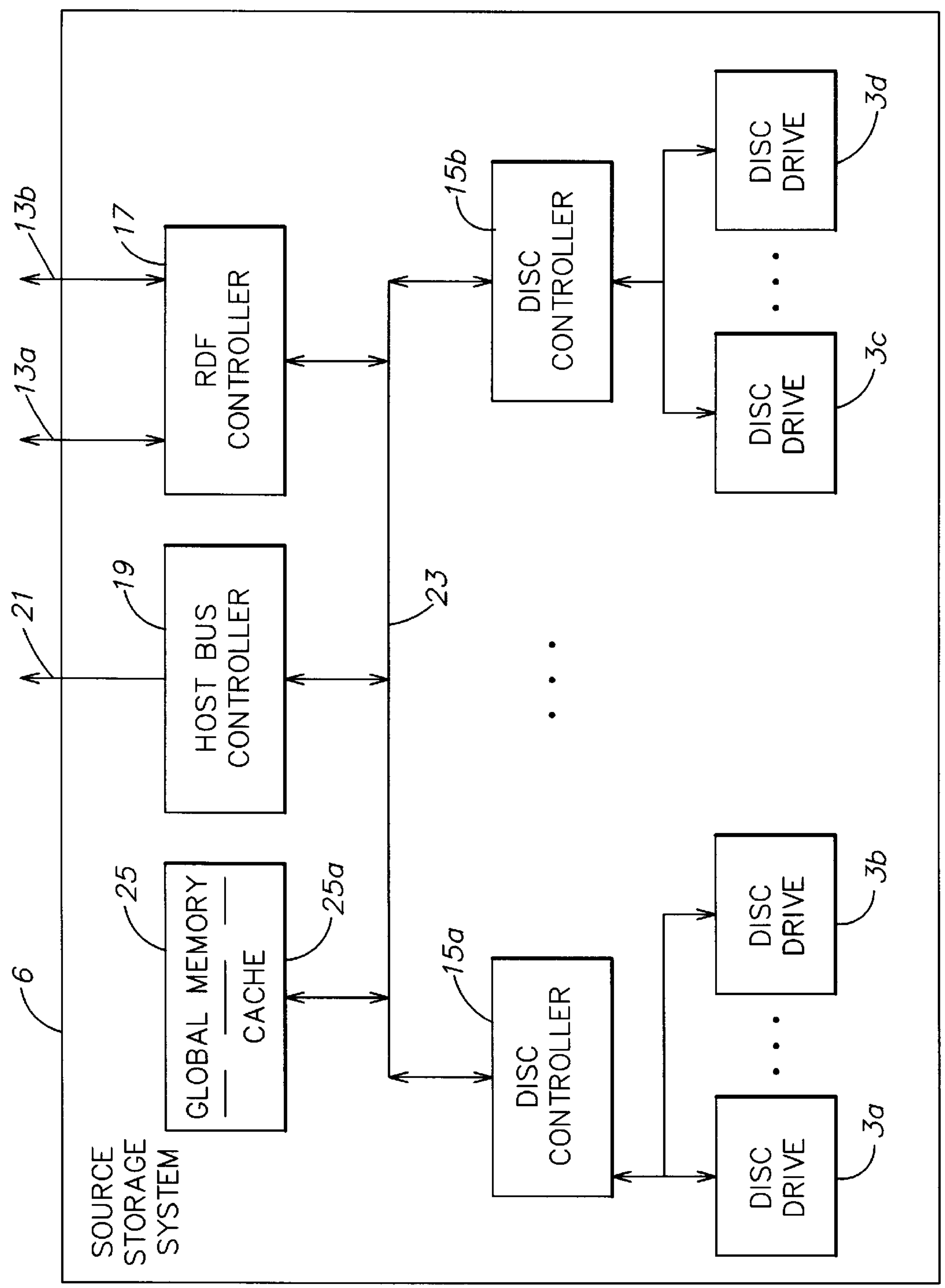
FIG. 2 is a block diagram of one illustrative implementation of a storage system that can be used in the remote mirroring data facility of FIG. 1.

One illustrative example of a source storage system on which the present invention can be implemented is the SYMMETRIX line of disc arrays discussed above. A simple block diagram of the SYMMETRIX storage system is shown in FIG. 2. It should be appreciated that the target storage system 8 can also be implemented in this manner. However, it should be appreciated that the present invention is not limited to implementation on a storage system of this type, and can be employed in any storage system. For example, the present invention is not limited to use with a storage system that employs one or more disc drives as the storage device 3,9, and can be used with numerous other types of storage devices (e.g., tape drives).

The exemplary storage system shown in FIG. 2 includes a plurality of disc drives 3*a–d* that implement the storage devices 3–9 of FIG. 1. The source storage controller 5 of FIG. 1 is distributed amongst a plurality of disc controllers 15*a–b*, each responsible for controlling a subset of the disc drives, an RDF controller 17 that controls communication with the target storage system 8 (FIG. 1) over the links 13*a–b*, and a host bus controller 19 that controls communication with the host CPU 1 (FIG. 1) over a communication link 21. The controllers 15*a–b*, 19 and 17 communicate via an internal bus 23. Also connected to the bus 23 is a global memory 25 that is accessible to each of the controllers and includes a data cache 25*a* to provide improved system performance. In particular, when the host CPU 1 executes a read from the storage system 6 of a track of information stored in the cache 25*a*, the source storage system 6 may service the read from the cache, rather than from the one of the disc drives 3*a–d* that stores the information, to execute the read more efficiently. Similarly, when the host CPU 1 executes a write to the source storage system 6, the host bus controller 19 typically executes the write to the cache 25*a*, with the command chain that executed the write being committed once the data is stored in the cache 25*a*. Thereafter, the write is destaged asynchronously (i.e., in a manner transparent to the host CPU 1) to the appropriate one of the disc drives 3*a–d*. Thus, the cache can be viewed as a temporary storage device, and each of the disc drives 3*a–d* as a permanent storage device within the storage system.

In one embodiment of the invention, command chains and their associated data are not stored in a special queue in the source storage system 6. Rather, data written from the CPU 1 is stored only in the storage resources already provided in the source storage unit 6, and is transferred to the target storage system 8 directly therefrom. In this respect, it should be appreciated that performance improvements are achieved when the data transferred to the target storage system 8 is read from the cache 25*a*, rather than from one of the disc drives 3*a–d*. Therefore, in accordance with one illustrative embodiment of the invention, when a command chain is executed that performs a write to the source storage system 6, the command chain is committed when the data is stored in the cache 25*a*, and this data is not stored in any additional queue to support the asynchronous mode of RDF. In this manner, no additional significant memory expense is required to provide a special data queue to support the asynchronous mode of RDF. However, unlike the simple example described above, techniques are employed to maintain consistency in each logical volume mirrored in the target storage system 8.

To prevent the problem discussed above in connection with the simple delay implementation of the asynchronous mode, in one embodiment of the present invention, the source storage system 6 does not overwrite any data that has not yet been committed to the target storage system 8. In accordance with this embodiment of the invention, the source storage system 6 maintains a data structure that includes information indicating which units of information updated in the source storage system have not yet been committed to the target storage system 8. In one embodiment of the invention, this information is maintained for each logical track. The data structure can be implemented in any of a number of ways. For example, a table can be provided in the global memory 25, and can be accessed by the host bus controller 19 prior to executing any write command from the host CPU 1. When the host bus controller 19 determines that a command issued from the host CPU 1 is attempting to overwrite a logical track that has not yet been committed to the target storage system 8, the host bus controller prevents that write from occurring. Although this inhibition of the write can be performed in a number of ways, in one embodiment of the present invention, the write prohibition is accomplished by disconnecting the logical volume that the host CPU 1 was attempting to write. As should be appreciated by those skilled in the art, most communication protocols (e.g., ESCON or Bus & Tag) used to implement the link 21 between the host CPU 1 and the source storage system 6 provide a disconnect facility in which the source storage system 6 can indicate to the host that it cannot service a requested write, and that the write will have to be retrieved at a subsequent time after the storage system indicates that it is capable of processing the write. The use of the disconnect facility to prohibit the write is advantageous because the host will recognize that not only can the present write not be processed, but that no additional writes to the disconnected logical volume should be sent until the source storage system 6 reconnects that volume.

In the discussion above, the size of the unit of information checked to prevent the overwriting of data that has not yet been destaged to the target system is a logical track, and the unit of information disconnected in response to an attempted overwrite is a logical volume. However, it should be appreciated that the present invention is not limited in this respect. A logical volume is a convenient unit to disconnect because that is what is supported by many communication protocols (e.g., ESCON). However, in an alternate embodiment, the unit of information that is disconnected in response to an attempted overwrite is the same unit that is checked to determine whether an attempted write will overwrite any data not yet destaged to the target system. Thus, in an alternate embodiment, in response to an attempted overwrite of a logical track, only that track is disconnected rather than its entire logical volume. Furthermore, it should be appreciated that the present invention is not limited to checking for possible overwrites using a granularity of logical tracks as the destination location for a write, as numerous other implementations are possible that can employ larger or smaller units of information. It should be appreciated that the smaller the unit of information checked for possible overwrites, the more precise the system is in detecting whether overwrites might actually have occurred. However, the smaller the unit of information used for this checking purpose, the greater the overhead in maintaining the data structure provided for this checking purpose.

As should be appreciated from the foregoing, after a logical volume is disconnected in response to an attempted overwrite, the source storage system 6 will not reconnect the logical volume until the updated information stored therein has been destaged to the target storage system 8. This destaging can occur in any of a number of ways. In one embodiment of the invention, the RDF controller 17 periodically polls the above-described table in global memory 25 to identify tracks that have not yet been destaged to the target storage system 8, and upon detecting such tracks, proceeds with transmitting a copy of the relevant data for that track (for example from cache **25*a*) to the target storage system 8. Once the information has been committed in the target storage system 8, the table in the global memory 25 is updated to reflect that the specified track is no longer among the list that includes inconsistent information between the source and target storage systems. Thus, after a logical volume has been disconnected in response to an attempted overwrite from the host CPU 1, the source storage system 6 can simply wait for the RDF controller 17 to destage the updated information to the target storage system 8 in the normal course of its background polling. However, it should be appreciated that it is desirable to minimize the time during which any logical unit of information is disconnected from use by the host CPU 1. Therefore, in accordance with one embodiment of the present invention, when any logical unit is disconnected, steps are taken to destage the information stored in that logical unit to the target storage system 8** immediately, so that the logical unit can be reconnected.

It should be appreciated that when a logical volume is disconnected in a response to an attempted overwrite of one of its tracks from the host CPU 1, there are times when more than simply the data for that logical track should be destaged to the target storage system 8 to maintain a consistent representation of the information stored on the source storage system 6. This can be demonstrated with a simple example in which three command chains are executed consecutively that each performs a write to the source storage system 6. A first command chain includes two commands, a first that executes a write to track LV1/T2 and a second that executes a write to track LV1/T3. A second command chain includes a single command and executes a write of data "A" to track LV2/T1. Finally, the third command chain also includes two commands, a first that writes data "B" to track LV2/T1, and a second that executes a write to track LV2/T5. The manner in which such a series of command chains would be processed in accordance with one illustrative embodiment of the present invention is discussed below.

When the first command chain is received, the data for tracks LV1/T2 and LV1/T3 is written to the cache **25*a* with respective designations that the data corresponds to tracks LV1/T2 and LV1/T3. In addition, the global memory 25 is updated to indicate that tracks LV1/T2 and LV1/T3 each includes newly updated information that has not yet been destaged to the target storage system 8. The first chain then is committed. Next, the second command chain is executed in a similar manner, with the data "A" being stored for track LV2/T1 in the cache 25*a*, and with the table in global memory 25 being updated to indicate that track LV2/T1 includes newly written data that has not yet been destaged to the target storage system. The second command chain then is committed to the host CPU 1. Upon the attempt to execute the third command chain, the host bus controller 19 detects from the table in global memory 25 that track LV2/T1 includes updated data (i.e., data "A") that has not yet been destaged to the target storage system, and should not be overwritten. Therefore, in the manner discussed above, the host bus controller 19** disconnects logical volume LV2.

As mentioned above, it is desirable to minimize the time that track LV2/T1 will be disconnected. If minimizing the disconnect time were the only consideration, the RDF controller 17 could simply read the data "A" for track LV2/T1 from the cache **25*a* and destage only that track to the target storage system 8. However, it should be appreciated that if this were to occur, the information stored on the target storage system 8 would not include a consistent representation at any point in time of the data stored on the source storage controller. In this respect, the target storage system 8** would include updated information for track LV2/T1, but not the information in tracks LV1/T2 and LV1/T3 previously written in the first command chain.

To address the foregoing concern, in one embodiment of the invention, whenever a collision is detected between an attempted write and a track flagged in the table in global memory 25 (resulting in a disconnect of the corresponding logical volume), the source storage system checks to determine whether any other tracks should be destaged to the target storage system 8 to maintain a consistent representation on the target storage system 8. This checking can be done in any of a number of ways. For example, after disconnecting a track, the host bus controller 19 can turn over control to the RDF controller 17, which can query the entries in the table in global memory 25 to determine which tracks should be destaged as a group. In one embodiment of the invention, all of the tracks flagged in the table in global memory 25 as including information that has been updated but not yet destaged to the target storage system 8 can be destaged together whenever a collision occurs that results in any logical volume being disconnected.

Although it is possible to destage all of the flagged entries in the table whenever any logical volume is disconnected, in an alternate embodiment of the invention, only a subset of the flagged tracks is destaged to minimize the disconnect time for the logical volume on which the collision occurred. For this embodiment of the invention, the logical units (e.g., logical volumes) in the source storage system 6 are arranged in a plurality of consistency sets, each of which can be specified by the host CPU 1. Each consistency set includes a number of logical units that together form a logical set that the host CPU 1 would like to ensure have a representation on the target storage system 8 that is consistent with a valid state on the source storage system 6 at one point in time. In the illustrative examples discussed herein, the consistency sets are arranged to include logical volumes. However, it should be appreciated that the present invention is not limited in this respect, and that the size of the logical units in the consistency sets can be larger or smaller than a logical volume.

An example of the manner in which the consistency sets can be employed is in connection with databases. In one example, the host CPU 1 might include two databases, referred to as DB1 and DB2. Each database may include a plurality of logical tracks. If DB1 included each of the logical tracks LV2/T1, LV1/T2, LV1/T3 and LV2/T5 written in the example described above, then when the collision was detected in the attempt to execute the third command chain and overwrite data "A" in track LV2/T1, one embodiment of the present invention would destage to the target storage system 8 not only the information stored in the track LV2/T1, but also all of the other tracks in its consistency set that include information that has been updated but not yet destaged. Thus, logical tracks LV1/T2 and LV1/T3 would also be destaged along with track LV2/T1. As a result, the database DB1 that the host CPU has designated as a consistency set will always include a representation on target storage system 8 that is consistent with information that was stored for the database on the source storage system 6 at some point in time. Thus, if an error or catastrophe is experienced that results in a loss of data on the source storage device 3, the information for the database DB1 at some point in time can be reconstructed from the target storage device 9.

It should be appreciated from the foregoing that the host may not be concerned with maintaining consistency between logical units that are not logically connected in the same consistency set. Referring again to the example above, if logical track LV2/T1 was in database DB1, while logical tracks LV1/T2 and LV1/T3 were in database DB2, the presently described embodiment of the invention would respond differently to the collision and corresponding disconnect of logical volume LV2 in response to the attempted execution of the third command chain. In particular, if logical tracks LV1/T2 and LV1/T3 were not in the same consistency set as LV2/T1, then in response to the collision, the source storage system 6 would only destage the information in logical track LV2/T1. The system would not take the time necessary to destage LV1/T2 and LV1/T3, thereby minimizing the disconnect time for logical volume LV2. It should be appreciated that as a result, the totality of the information stored on the target storage system 8 may not be consistent with the totality of the information stored on the source storage system 6 at any point in time. However, this inconsistency is not significant, because each consistency set (e.g., databases DB1 and DB2) specified by CPU 1 is maintained to be internally consistent.

In one embodiment of the invention, both of the above-described techniques for destaging information from the source storage system 6 to the target storage system 8 are employed. That is, in addition to immediately destaging each of the flagged logical tracks in a consistency set with which a collision is detected in the table in global memory 25, one embodiment of the present invention also periodically polls the table in the background to destage logical tracks whenever possible. This polling can be implemented, for example, in the RDF controller 17. This use of periodic polling in addition to destaging upon a collision is advantageous for two reasons. First, destaging logical units in the background minimizes the possibility of collisions and the resulting delay due to disconnects of logical units. Second, it is desirable to update the target storage system 8 as close to real time as possible.

It should be appreciated that there are two parameters of the system in the above-described embodiments of the present invention that impact the ability to minimize the disconnect time, i.e., the number of logical units in each consistency set and the maximum number of commands that can be provided in any command chain. With respect to the number of logical units (e.g., logical volumes) in a consistency set, it should be appreciated from the foregoing that when a logical track is to be destaged to the target storage system (in response to a collision during an attempted write or a background polling operation), it will be destaged together with all of the other logical tracks in its corresponding consistency set that include information that has not yet been destaged to the target storage system. If there is a large number of logical units in a consistency set, a lot of information will need to be destaged together, which can result in a long disconnect time for the logical volume on which the collision has occurred. Therefore, in accordance with one embodiment of the present invention, the number of logical volumes in each consistency set is maintained to be relatively small. The precise number will of course vary from system to system, and the present invention is not limited to any particular number. For most systems, a limit of approximately twenty logical volumes per consistency set should provide sufficiently small disconnect times.

With respect to the length of the command chains, it should be appreciated that a command chain is not committed until all of the commands included therein have been committed. Since it is desirable to ensure that the target storage system 8 always includes a valid set of data consistent with the source storage system 6 at some point in time, it is preferred that no information updated by a command chain be destaged to the target storage system 8 until the entire chain has been committed to the source storage system 6. If there were no limit placed on the number of commands in a command chain, chains could theoretically be long enough to write sufficient data to overflow the cache 25*a*, requiring some of the data in the command chain to be destaged to the disc drives 3*a–d* before the chain can be committed. Destaging all of the information stored by such a command chain in response to a collision in the table in global memory 25 could result in an undesirably long disconnect. Furthermore, even if a command chain were not so long as to overflow the cache, if a command chain wrote thousands of logical units to the cache, a destaging of the command chain to the target storage system in response to a collision could still result in an unacceptably long disconnect time.

In view of the foregoing, in one embodiment of the present invention, a limit is placed upon the length of a valid command chain that can be passed from the host CPU 1 to the source storage system 6 when the remote data facility is operating in asynchronous mode. The specific number of commands supported for a chain may vary from system to system, and the present invention is not limited to any specific command chain length. It is believed that a command chain limit of approximately one hundred commands may provide sufficiently short disconnect times, and sufficient flexibility for the host CPU 1 to support most applications for which it is desirable to operate in asynchronous mode.

It should be appreciated that implementing an RDF system in asynchronous mode has some impact on the manner in which information is transmitted over the link 13 between the source and target storage systems. As discussed in the assignee's co-pending application Ser. No. 08/918,238 discussed above, when the link 13 between the source and target storage systems is long, it is desirable for performance reasons to minimize transactions between the source and target storage systems, so that data for consecutive destaging operations can be packed together in a single data transmission over the link 13 without any significant gaps disposed therebetween. One limitation on the ability to achieve such a performance advantage in an RDF system that operates synchronously is that the host CPU 1 will typically not have multiple write operations outstanding to the same logical volume. In this respect, if the host desires to perform two write operations to a single logical volume, it will typically withhold the second write until the first write to that logical volume has been committed to the source storage system 6. As discussed above, in a synchronous system, the write will not be committed until the data is stored on the target storage system 8. Thus, for any application that heavily uses one or more logical volumes, the performance of a synchronous system may suffer due to the inability of the host to have multiple uncommitted write operations outstanding to a single logical volume.

As should be appreciated from the foregoing, the asynchronous mode of the present invention provides an advantage over a synchronous system in handling multiple consecutive write operations to a single logical unit. In particular, each write operation can be committed as soon as the data is stored within the source storage system 6, thereby enabling the CPU 1 to execute multiple write operations to a single logical unit without being impacted by the propagation delay through the link 13, subject only to the restriction discussed above wherein collisions to the same track result in a disconnect of the logical unit until the earlier-written data is destaged to the target storage system 8. Furthermore, the transfer of data from the source storage system 6 to the target storage system 8 is controller entirely by the RDF system in a manner that is transparent to the host CPU 1.

The operation in asynchronous mode without queuing the command chains introduces a level of complexity in the handling of the data received at the target storage system 8 that is not found in a synchronous system. In particular, in a synchronous system the command chains are sent in order to the target storage system 8. Thus, the entire structure of the command chains is transmitted to the target storage system 8. Conversely, in the above-described embodiments of the present invention relating to asynchronous operation, the command chains are not queued. Nevertheless, in one embodiment of the invention, some indication of the order in which data is committed by the command chains is preserved to maintain the consistency of the data stored on the target storage system 8.

To illustrate the significance of maintaining the order of the data written by the command chains, the above-described example relating to the three command chains is revisited. In the first command chain, two commands are executed that successively write data to tracks LV1/T2 and LV1/T3. The second command chain includes a single command that writes data "A" to track LV2/T1. The third command chain includes two commands that successively write data "B" to track LV2/T1, and then write data to track LV2/T5. As discussed above, in accordance with one embodiment of the invention, the attempt to overwrite the information in track LV2/T1 will be detected by the host bus controller 19, and result in a disconnect of logical volume LV2, as well as a destaging of the information in track LV2/T1 and the other tracks in its consistency set. Assuming again that logical volumes LV1 and LV2 are grouped in the same consistency set, the destaging operation will result in a transfer of the data relating to tracks LV2/T1, LV1/T2 and LV1/T3 over the links **13*a* and 13*b* to the target storage system 8. To ensure the consistency of the data stored on the target storage system 8, one embodiment of the present invention ensures that the data written by the first command chain (i.e., tracks LV1/T2 and LV1/T3) is committed to the target storage system 8** prior to the data (i.e., track LV2/T1) written by the second command chain.

To ensure that order is maintained for the information being destaged to the target storage system 8, one embodiment of the present invention stores information relating to the chain structure of all of the units of information that are identified in the table in global memory 25 as having been updated but not yet destaged to the target storage system 8. This information can be stored in any of a number of different ways, and the invention is not limited to any particular implementation. In one illustrative embodiment of the invention, packets of information are created and continually updated for each consistency set. Each packet indicates which units of information (tracks in the example above) were written by the same command chain and should therefore be committed to the target storage system simultaneously. In addition, each packet maintains the order in which the tracks were updated by their successive command chains, so hat the tracks of information can be committed to the target storage system 8 in the same order.

Problems could be encountered if logical units of information that were written by a single command chain are not committed simultaneously in the target storage system 8. For example, if the link 13 between the source and target storage systems were to go down in the middle of transmitting information relating to a particular command chain, some of the data may be committed to the target storage system 8, while other data might not. This would destroy the consistency of the data in the target storage system with respect to the source storage system, as the data in the target storage system would not be consistent with that stored in the source storage system at any particular point in time. Thus, in accordance with one embodiment of the present invention, all of the units of information written by a command chain are committed to the target storage system simultaneously. This can be done in a number of ways. For example, when the data is received at the target storage system 8, it can be written directly to the cache **25*a* (FIG. 2), but with an indication that the cache entry is not yet valid. Once all of the data for the consistency set is received, as well as the packet that identifies its chain structure or commitment order, the target storage system 8 can then designate the appropriate cache entries as valid (essentially committing the write operation for that data) in the order specified by the packet. Thus, each data location written by commands in a single chain can be validated or committed simultaneously. It should be appreciated that the commitment scheme at the target storage system 8 can alternatively be implemented in a number of other ways. For example, the data received at the target storage system can be stored in a temporary storage location other than the cache 25*a* (e.g., elsewhere in global memory 25), and then can be written or committed to the cache 25*a*** in the order specified by the packet.

A further level of complexity is added due to the fact that in one embodiment of the present invention, multiple links **13*a* and 13*b* are provided between the source and target storage systems 6 and 8 to maximize performance. It is desirable to not synchronize the links 13*a* and 13*b*, but rather to transfer data over these links in a manner that most effectively balances the load between them to provide the best overall system performance. Thus, the order in which tracks of data arrive at the target storage system 8 does not necessarily indicate the order in which the data should be committed to the target storage system 8, as the data may be received in an order that differs from the commitment order. Thus, the use of packets of information that specify the relevant order for committing the data received at the target storage system 8 also advantageously enables multiple links 13***a* and 13*b* to be utilized in an asynchronous manner that maximizes system performance.

It should be appreciated that multiple packets relating to tracks for a single consistency set may be in transit over the links 13*a–b* between the source and target storage systems 6 and 8 simultaneously. For example, for a consistency set including a logical volume LV1 including one hundred tracks T1–T100, a number of write operations could occur creating a collision at track T5, at a time when only tracks T1–T5 had been written but not yet destaged to the target storage system. At that point, in the manner described above, the information included in tracks T1–T5 could be transferred (as a group of tracks for which consistency should be maintained) over the links 13*a–b* to the target storage system 8, along with a packet defining the commitment order for tracks T1–T5. Thereafter, and before tracks T1–T5 are committed to the target storage system 8, another series of writes can occur leading to another collision in the same consistency set, e.g., on track T50. At that point, the information in track T50, along with any other tracks in the consistency set that have been updated subsequent to the creation of the first packet for the consistency set, would be transferred over the links 13*a–b* to the target storage system 8, along with a packet defining the structure of the command chains that updated the consistency set subsequent to the prior packet created for the consistency set.

As seen from the foregoing example, numerous packets and groups of tracks for a single consistency set may be in transit simultaneously from the source storage system 6 to the target storage system 8. It should be appreciated that to maintain consistency between the data stored on the source and target storage systems, the groups of tracks for any consistency set should be committed to the target storage system 8 in the order in which their packets were created. If only a single link 13 were employed to transfer information between the source and target storage systems, the order of the packets for a particular consistency set could be determined based upon the order in which the packets were received at the target storage system 8. However, as discussed above, in one embodiment of the present invention, multiple links 13*a*–13*b* are employed to improve system performance. As discussed above, it is preferable to not synchronize the information sent over the multiple links to maximize system performance. Therefore, in accordance with one illustrative embodiment of the invention, a technique is employed to ensure that the packets for any particular consistency set are committed to the target storage system 8 in the order in which the packets were generated.

It should be appreciated that the concern with respect to committing packets to the target storage system 8 in order applies only to packets corresponding to the same consistency set. In this respect, since consistency need not be maintained between different consistency sets, order need not be maintained between packets relating to different consistency sets.

In accordance with one illustrative embodiment of the invention, order between packets relating to the same consistency set is maintained by transferring those packets over a single one of the multiple links 13*a*–13*b*. In this respect, a single one of the multiple links can be employed to transmit all of the packets that include the command chain structures for the data destaged from the source to the target storage system. Each packet will include relatively little data, and therefore, require relatively little bandwidth over the selected one of the links 13*a*–13*b*. Therefore, limiting the packets to a single one of the multiple links 13*a*–13*b* should not have a significant impact on the ability of the source storage system 6 to balance the loads transferred over the multiple links in an attempt to maximize performance. Furthermore, it should be appreciated that all of the packets need not be transmitted over a single one of the links. Rather, the packets for different consistency sets can be transferred over different ones of the links 13*a*–13*b*, with only the packets corresponding to the same consistency set being restricted to transfer over the same link.

It should be appreciated that like any other data transmitted over a transmission medium, errors (e.g., due to data corruption) can occur in the transmission of the packets over the links 13*a*–13*b*. The possibility of an error occuring in one of the packets for a consistency set adds a level of complexity to the error recovery routine. In particular, if a packet for a particular consistency set is corrupted, the group of tracks corresponding thereto will not immediately be committed to the target storage system 8 upon receipt of the corrupted packet. Typically, error recovery will involve a re-transmission of the corrupted packet over the appropriate one of the links 13*a*–13*b*. However, it is possible that other packets relating to the same consistency set will be received at the target storage system 8 prior to the re-transmitted packet. It should be appreciated that the error recovery routine should ensure that the subsequent packets for the same consistency set are not committed to the target storage system 8 until after the corrupted packet has been re-transmitted and committed to the target storage system. Otherwise, packets for the consistency set could be committed out of order at the target storage system 8, resulting in the information stored thereon not being consistent with the data stored on the source storage system at any point in time. The error recovery routine can be implemented in any of a number of ways, and the present invention is not limited to any particular implementation.

Aside from maintaining the order of packets relating to the same consistency set, it should be appreciated that there are no restrictions on the manner in which the packets and data to which they correspond can be transmitted over the multiple links 13*a*–13*b*. In this respect, a packet can be transferred over either the same or a different one of the multiple links than the data to which it corresponds, and can be transferred in any order with respect to its corresponding data. Similarly, the data destaged together for a consistency set can be transferred over the same or different ones of the multiple links, and in either the same order in which it will be committed to the target storage system or in a different order. Using the order in which the packets for a single consistency set are received, as well as the information included in the packets, the target storage system 8 has all of the information necessary to commit the received data in a manner that is consistent with the way the data was committed to the source storage system 6, without regard to the order in which the data is received at the target storage system. It should be appreciated that the operation and processing of the packets can be controlled in a number of ways, such as by the RDF controller 17.

It should be appreciated that each of the controllers 15*a–b*, 17 and 19 can be implemented in a number of ways to perform the above-described functions relating to asynchronous RDF, as well as other functions relating to the operation of the storage units 6, 8. For example, each controller can include a processor and a memory, and can include software (e.g., microcode) stored in the memory to control the processor and cause it to perform the functions of the controllers. Alternatively, each of the controllers can include dedicated hardware to perform their desired functions. In addition, although the pre-existing controllers in the storage units 6–8 can be used to implement the aspects of the present invention described above, it should be appreciated that the present invention is not limited in this respect, and that dedicated controllers can be provided to perform solely the functions that implement the aspects of the present invention described above.

FIG. 3 is a schematic illustration of one illustrative implementation of the table 30 that can be provided in global memory 25 to support asynchronous RDF. It should be appreciated that the present invention is not limited to this specific implementation, and that the table 30 can be implemented in a number of other ways. Furthermore, as discussed above, data structures other than a table can alternatively be used to perform the same function. In the illustrative implementation shown in FIG. 3, the table is indexed via disc and track number, although other implementations are obviously possible. For each track, a flag is set indicating whether or not an RDF commitment is pending. As stated above, an RDF commitment is pending when the host CPU 1 has written data to a particular track, but that write has not yet been committed to the target storage system 8. For each entry for which an RDF commitment is pending, the table further includes a status field indicating whether or not a packet that includes the relevant track is pending (i.e., has been sent to but not yet been processed by the target storage system). This information is used in the manner described above when multiple packets are sent to the target storage system for the same consistency set. Thus, when a packet is created for a consistency set in response to a collision or a background polling check of the table 30, a packet will be created to include those entries that have a flag (Y for yes in FIG. 3) set in their RDF commitment pending field and no flag set in their packet pending field. Finally, the table includes an entry identifying which consistency set the track belongs to.

The consistency set can be implemented in any of a number of manners. For example, using object oriented programming, the consistency set can be an object that includes information concerning each track assigned thereto. The object defining the consistency set can maintain a list of the tracks included therein that have, at any point in time, an RDF commitment pending but for which no packet is pending, as well as the chain information relating to the order in which those tracks were updated between various command chains. That information can be used in the manner discussed below to generate the packets of information transferred to the target storage system 8.

FIG. 4 illustrates one exemplary routine that can be executed by the host bus controller 19 in accordance with one embodiment of the present invention whenever a command chain is received from the host CPU 1 that includes a write command. Initially, in step 41, the routine selects the first command in the chain. The routine then proceeds to step 43, wherein a determination is made as to whether an RDF commitment is pending for the track written by the selected command. This determination can be made by checking the appropriate flag in the table shown in FIG. 3. When it is determined that no RDF commitment is pending, the routine proceeds to step 45, wherein the command is committed in the source storage system 6 in the normal fashion. In this respect, the command is typically written to an appropriate location in the cache 25*a*, but is not yet indicated as valid data because the entire command chain has not yet been committed. Next, the routine proceeds to step 47, wherein a determination is made as to whether the last command in the chain has been processed, and when it has not, the routine proceeds in step 49 to go to the next command, and then returns to step 43. In this manner, the routine processes each of the commands in the chain to determine whether any has an RDF commitment pending. When none of the tracks written by the command chain has an RDF commitment pending (which is determined at step 47 when the last command in the chain has been processed), the routine proceeds to step 48, wherein the command chain is committed, and the routine terminates.

When it is determined at step 43 that the command being processed has an RDF commitment pending, the routine proceeds to step 51, wherein the logical volume corresponding to the track that has the commitment pending is disconnected. Thereafter, the routine proceeds to step 53, wherein the host bus controller sends an indication to the RDF controller 17 that the consistency set for the track that has the commitment pending should be destaged to the target storage system 8. The consistency set is identified via the appropriate entry in the table of FIG. 3, and is provided to the RDF controller 17. Thereafter, the routine terminates.

FIG. 5 is an illustrative example of a routine that can be executed by the RDF controller 17 in the source storage system 6 to implement the above-described embodiment of the invention relating to the asynchronous transfer of information to the target storage system 8. As mentioned with respect to step 53 of FIG. 4, the routine of FIG. 5 is called in response to the host bus controller signaling the RDF controller to destage a particular consistency step. Initially, in step 61, the routine queries the object that defines the consistency set to determine the identity of the tracks that are included therein, have their RDF commitment pending flags set, and for which a packet pending flag is not set. In step 63, the first of these tracks is read (typically from cache 25*a*) and transferred over one of the links 13*a–b* to the target storage controller. Thereafter, the routine proceeds to step 65, wherein a determination is made as to whether the last track identified in step 61 has been processed, and when it has not, the routine proceeds to step 67, wherein the next track is read and transmitted over one of the links 13*a–b* to the target storage system. When the last track has been processed, the routine proceeds to step 69, wherein the packet specifying the commitment order for the transmitted tracks is transmitted over one of the links 13*a–b* to the target storage system. Thereafter, in step 70, the packet pending flag in the table of FIG. 3 is set for each of the tracks in the consistency set identified in step 61. As discussed above, the invention is not limited to the particular implementation shown in FIG. 5 as numerous other implementations are possible. For example, the implementation can obviously be modified so that the packet can be transmitted before any of the tracks, or between some of the tracks.

After all of the tracks and the packet have been transmitted, the routine waits in step 71 for some status indication from the target storage system 8 that the transmitted tracks have been committed to the target storage system. Obviously, some time out feature can be employed in the event that status is not received during a expected time period. If such a time out occurs, the table 30 (FIG. 3) can be modified to remove the packet pending flags that were set in step 70. In addition, it should also be appreciated that the RDF controller 17 can also perform other useful operations while awaiting status from the target storage system 8 in step 71, including the destaging of other tracks for the same or a different consistency set.

When the status is received indicating that the transmitted tracks have been committed at the target storage system 8, the routine proceeds to step 73, wherein the RDF commitment pending and packet pending flags in the table of FIG. 3 are cleared for the tracks identified in step 61. Finally, the routine signals, in step 75, the host bus controller 19 to reconnect the logical volume that was disconnected in step 51 (FIG. 4).

It should be understood that various changes and modification of the embodiments shown in the drawings and described in the specification may be made within the scope of the invention. It is intended that all matter contained in the above-description and shown in the accompanying drawings be interpreted in an illustrative and not in a limiting sense. The invention is only limited as defined in the following claims and their equivalence thereto.

What is claimed is:

1. In a computer system including a central processing unit (CPU), a first storage system that is coupled to the CPU, a second storage system, and a communication link coupling the second storage system to the first storage system, a method of asynchronously mirroring, to the second storage system, a plurality of units of data written by the CPU to the first storage system, wherein the CPU writes the units of data to the first storage system in a first order, the method comprising steps of:

(A) storing the units of data in the first storage system without buffering a copy of the units of data in a queue to support asynchronous mirroring of the units of data to the second storage system; and (B) asynchronously transmitting the units of data over the communication link from the first storage system to the second storage system in a second order that is different than the first order.

2. The method of claim 1, further including a step of:

(C) committing the units of data in the second storage system.

3. The method of claim 2, wherein step (C) further includes a step of committing the units of data in the second storage system in a third order that is different than the second order.

4. The method of claim 2, wherein the first storage system includes a plurality of storage locations, wherein the CPU writes each of the units of data to a destination location among the plurality of storage locations in the first storage system, and wherein step (A) includes a step of, prior to storing one of the plurality of units of data to its destination location in the first storage system, determining whether the destination location stores a previously written unit of data that has not yet been committed in the second storage system.

5. The method of claim 4, wherein step (A) includes a step of, when it is determined that the CPU has attempted a write to a destination location in the first storage system that stores a previously written unit of data that has not yet been committed in the second storage system, informing the CPU that the attempted write cannot currently be processed.

6. The method of claim 4, wherein step (A) includes a step of, when it is determined that the CPU has attempted a write to a destination location in the first storage system that stores a previously written unit of data that has not yet been committed in the second storage system, disconnecting the destination location from access by the CPU.

7. The method of claim 4, wherein step (B) includes a step of, when it is determined that the CPU has attempted a write to a destination location in the first storage system that stores a previously written unit of data that has not yet been committed in the second storage system, immediately transmitting the previously written unit of data in the destination location over the communication link from the first storage system to the second storage system.

8. The method of claim 4, wherein step (B) includes, when it is determined that the CPU has attempted a write to a destination location in the first storage system that stores a previously written unit of data that has not yet been committed in the second storage system, steps of:

determining whether the destination location belongs to a consistency set of storage locations that should have a representation in the second storage system that is consistent with a valid representation of the set of storage locations in the first storage system at some point in time; and when the destination location belongs to a consistency set, performing the steps of:

identifying a group of other locations in the consistency set that include previously written units of data that have not yet been transmitted to the second storage system; and immediately transmitting the units of data in the destination location and the group of other locations in the consistency set over the communication link from the first storage system to the second storage system.

9. The method of claim 4, wherein step (B) includes, when it is determined that the CPU has attempted a write to a destination location in the first storage system that stores a previously written unit of data that has not yet been committed in the second storage system, steps of:

identifying other storage locations in the first storage system that include previously written units of data that have not yet been transmitted to the second storage system; and immediately transmitting each of the previously written units of data that have not yet been transmitted to the second storage system over the communication link from the first storage system to the second storage system.

10. The method of claim 1, wherein step (B) includes steps of:

periodically determining whether any of the storage locations in the first storage system include previously written units of data that have not yet been transmitted to the second storage system; and when it is determined that at least one of the storage locations in the first storage system includes a previously written unit of data that has not yet been transmitted to the second storage system, transmitting the previously written unit of data stored in the at least one of the storage locations over the communication link from the first storage system to the second storage system.

11. The method of claim 10, wherein when a first location is identified that includes a previously written unit of data that has not yet been transmitted to the second storage system, step (B) further includes steps of:

determining whether the first location belongs to a consistency set of storage locations that should have a representation in the second storage system that is consistent with a valid representation of the set of storage locations in the first storage system at some point in time; and when the first location belongs to a consistency set, performing the steps of:

identifying a group of other locations in the consistency set that include previously written units of data that have not yet been transmitted to the second storage system; and immediately transmitting the units of data in the first location and the group of other locations in the consistency set over the communication link from the first storage system to the second storage system.

12. The method of claim 1, wherein the plurality of units of data are written by a plurality of command chains issued from the CPU to the first storage system, and wherein step (B) includes a step of not transmitting any one of the units of data from the first storage system to the second storage system until the entire command chain that wrote the one of the units of data has been committed to the first storage system.

13. The method of claim 4, wherein when it is determined that the CPU has attempted a write to a destination location in the first storage system that stores a previously written unit of data that has not yet been committed in the second storage system:

step (A) includes a step of disconnecting the destination location from access by the CPU;

step (B) includes steps of;

determining whether the destination location belongs to a consistency set of storage locations that should have a representation in the second storage system that is consistent with a valid representation of the set of storage locations in the first storage system at some point in time; and when the destination location belongs to a consistency set, identifying a group of other locations in the consistency set that include previously written units of data that have not yet been transmitted to the second storage system;

step (A) includes a step of reconnecting the destination location for access by the CPU; and step (B) includes a step of, prior to reconnecting the destination location, transmitting over the communication link from the first storage system to the second storage system only the units of data in the destination location and the group of other locations in the consistency set.

14. The method of claim 1, wherein the first storage system includes a cache and at least one storage device, and wherein step (A) includes steps of:

storing a single copy of each unit of data directly into the cache without buffering a copy of each unit of information in a queue to support asynchronous mirroring; and destaging the units of data from the cache to the at least one storage device.

15. The method of claim 1, wherein the CPU executes writes to the first storage system based on units of information organized within logical volumes, and wherein step (B) includes a step of simultaneously transmitting over the link two units of data written by the CPU to a single logical volume on the first storage system.

16. The method of claim 1, further including steps of:

transmitting at least one packet of information over the communication link from the first storage system to the second storage system, the at least one packet specifying an order in which the units of data should be committed in the second storage system; and committing the units of data in the second storage system in the order specified by the packet of information, independent of the order in which the units of data are received at the second storage system.

17. The method of claim 16, wherein the communication link includes a plurality of parallel communication channels between the first and second storage systems, and wherein step (B) includes a step transmitting the units of data over the plurality of communication channels in an unsynchronized manner so that the units of data are not restricted to transmission in the order in which the units of information are to be committed to the second storage system.

18. The method of claim 8, wherein step (B) further includes steps of:

periodically determining whether any of the storage locations in the first storage system include previously written units of data that have not yet been transmitted to the second storage system; and when it is determined that at least one of the storage locations in the first storage system includes a previously written unit of data that has not yet been transmitted to the second storage system, transmitting the previously written unit of data stored in the at least one of the storage locations over the communication link from the first storage system to the second storage system.

19. A source storage system for use in a computer system including a central processing unit (CPU) coupled to the source storage system, a target storage system, and a communication link coupling the target storage system to the source storage system, wherein the CPU writes a plurality of units of data to the source storage system in a first order, the source storage system including:

at least one storage device that includes a plurality of storage locations; and at least one controller that stores the units of data written by the CPU to the at least one storage device and mirrors at least some of the plurality of units of data written to the at least one storage device to the target storage system, wherein the at least one controller asynchronously transmits the at least some of the units of data over the communication link from the source storage system to the target storage system in a second order that is different than the first order in which the some of the units of data are written from the CPU to the source storage system, and wherein the at least one controller does not buffer the units of data written by the CPU in a queue to support asynchronous transmission to the target storage system.

20. The source storage system of claim 19, wherein the CPU writes each of the units of data to a destination location among the plurality of storage locations, and wherein the at least one controller includes means for, prior to storing one of the plurality of units of data to its destination location in the at least one storage device, determining whether the destination location stores a previously written unit of data that has not yet been committed in the target storage device.

21. The source storage system of claim 20, wherein the at least one controller includes means for, when it is determined that the CPU has attempted a write to a destination location that stores a previously written unit of data that has not yet been committed in the target storage device, informing the CPU that the attempted write cannot currently be processed by the source storage system.

22. The source storage system of claim 20, wherein the at least one controller includes means for, when it is determined that the CPU has attempted a write to a destination location that stores a previously written unit of data that has not yet been committed in the target storage device, disconnecting the destination location from access by the CPU.

23. The source storage system of claim 20, wherein the at least one controller includes means for, when it is determined that the CPU has attempted a write to a destination location that stores a previously written unit of data that has not yet been committed in the target storage device, immediately transmitting the previously written unit of data in the destination location over the communication link from the source storage system to the target storage device.

24. The source storage system of claim 20, wherein the at least one controller includes:

means for, when it is determined that the CPU has attempted a write to a destination location that stores a previously written unit of data that has not yet been committed in the target storage device, determining whether the destination location belongs to a consistency set of storage locations that should have a representation in the target storage device that is consistent with a valid representation of the set of storage locations in the source storage system at some point in time;

means for identifying a group of other locations in the consistency set that include previously written units of data that have not yet been transmitted to the target storage device; and means for immediately transmitting the units of data in the destination location and the group of other locations in the consistency set over the communication link from the source storage system to the target storage device.

25. The source storage system of claim 20, wherein the at least one controller includes:

means for, when it is determined that the CPU has attempted a write to a destination location that stores a previously written unit of data that has not yet been committed in the target storage device, identifying other storage locations in the at least one storage device that include previously written units of data that have not yet been transmitted to the target storage device; and means for immediately transmitting each of the previously written units of data that have not yet been transmitted to the target storage device over the communication link from the source storage system to the target storage device.

26. The source storage system of claim 19, wherein the at least one controller includes:

polling means for periodically determining whether any of the plurality of storage locations include previously written units of data that have not yet been transmitted to the target storage device;

means for, when it is determined that at least one of the storage locations in the source storage system includes a previously written unit of data that has not yet been transmitted to the target storage device, transmitting the previously written unit of data stored in the at least one of the storage locations over the communication link from the source storage system to the target storage device.

27. The source storage system of claim 26, wherein the at least one controller includes:

means for, when the polling means identifies a first location that includes a previously written unit of data that has not yet been transmitted to the target storage device, determining whether the first location belongs to a consistency set of storage locations that should have a representation in the target storage device that is consistent with a valid representation of the set of storage locations in the source storage system at some point in time;

means for, when the first location belongs to a consistency set, identifying a group of other locations in the consistency set that include previously written units of data that have not yet been transmitted to the target storage device; and means for immediately transmitting the units of data in the first location and the group of other locations in the consistency set over the communication link from the source storage system to the target storage device.

28. The source storage system of claim 19, wherein the plurality of units of data are written by a plurality of command chains issued from the CPU to the source storage system, and wherein the at least one controller includes means for not transmitting any one of the units of data from the source storage system to the target storage device until the entire command chain that wrote the one of the units of data has been committed to the source storage system.

29. The source storage system of claim 20, wherein the at least one controller includes:

means for, when it is determined that the CPU has attempted a write to a destination location in the source storage system that stores a previously written unit of data that has not yet been committed in the target storage device, disconnecting the destination location from access by the CPU;

means for determining whether the destination location belongs to a consistency set of storage locations that should have a representation in the target storage device that is consistent with a valid representation of the set of storage locations in the source storage system at some point in time;

means for, when the destination location belongs to a consistency set, identifying a group of other locations in the consistency set that include previously written units of data that have not yet been transmitted to the target storage device;

means for reconnecting the destination location for access by the CPU; and means for, prior to reconnecting the destination location, transmitting over the communication link from the source storage system to the target storage device only the units of data in the destination location and the group of other locations in the consistency set.

30. The source storage system of claim 19, wherein the at least one storage device includes a cache and at least one permanent storage device, and wherein the at least one controller includes:

means for storing a single copy of each unit of data directly into the cache without buffering a copy of each unit of information in a queue to support asynchronous mirroring.

31. The source storage system of claim 19, wherein the CPU executes writes to the source storage system based on units of information organized within logical volumes, and wherein the at least one controller includes means for simultaneously transmitting over the link two units of data written by the CPU to a single logical volume on the source storage system.

32. The source storage system of claim 19, wherein the at least one controller includes means for transmitting at least one packet of information over the communication link from the source storage system to the target storage device, the at least one packet specifying an order in which the units of data transmitted over the communication link should be committed in the target storage device.

33. The source storage system of claim 32, in combination with the communication link and the target storage system, wherein the target storage system includes means for committing the units of data in the target storage device in the order specified by the at least one packet of information, independent of the order in which the units of data are received at the target storage device.

34. The combination of claim 33, wherein the communication link includes a plurality of parallel communication channels between the source and target storage devices, and wherein the at least one controller includes means for transmitting the units of data over the plurality of communication channels in an unsynchronized manner so that the units of data are not restricted to transmission in the order in which the units of information are to be committed to the target storage device.

35. The computer system of claim 19, in combination with the communication link and the target storage system, wherein the target storage system includes at least one target controller that commits the units of data received over the communication link in the target storage device, wherein the at least one target controller includes means for committing the units of data received over the communication link in an order that is different than the order in which the units of data are received at the target storage system.

36. The source storage system of claim 24, wherein the at least one controller includes:

polling means for periodically determining whether any of the plurality of storage locations include previously written units of data that have not yet been transmitted to the target storage device;

means for, when it is determined that at least one of the storage locations in the source storage system includes a previously written unit of data that has not yet been transmitted to the target storage device, transmitting the previously written unit of data stored in the at least one of the storage locations over the communication link from the source storage system to the target storage device;

means for, when the polling means identifies a first location that includes a previously written unit of data that has not yet been transmitted to the target storage device, determining whether the first location belongs to a consistency set of storage locations that should have a representation in the target storage device that is consistent with a valid representation of the set of storage locations in the source storage system at some point in time;

means for, when the first location belongs to a consistency set, identifying a group of other locations in the consistency set that include previously written units of data that have not yet been transmitted to the target storage device; and means for immediately transmitting the units of data in the first location and the group of other locations in the consistency set over the communication link from the source storage system to the target storage device.

37. The source storage system of claim 23, wherein the at least one controller includes:

polling means for periodically determining whether any of the plurality of storage locations include previously written units of data that have not yet been transmitted to the target storage device;

means for, when it is determined that at least one of the storage locations in the source storage system includes a previously written unit of data that has not yet been transmitted to the target storage device, transmitting the previously written unit of data stored in the at least one of the storage locations over the communication link from the source storage system to the target storage device.

38. The source storage system of claim 19, in combination with the communication link and the target storage system to form a remote mirroring data facility.

39. In a computer system including a central processing unit (CPU), a first storage system that is coupled to the CPU, a second storage system, and a communication link coupling the second storage system to the first storage system, a method of mirroring, to the second storage system, a plurality of units of data written by the CPU to the first storage system, the method comprising steps of:

(A) storing the units of data in the first storage system without buffering a copy of the units in a queue to support mirroring of the units of data to the second storage system;

(B) transmitting the units of data over the communication link from the first storage system to the second storage system in a first order; and (C) committing the units of data in the second storage system in a second order that is independent of the order in which the units of data are received at the second storage system.

40. The method of claim 39, wherein step (C) includes a step of committing the units of data in the second storage system in a second order that is different than the first order.

41. The method of claim 39, further including steps of:

(D) transmitting at least one packet of information over the communication link from the first storage system to the second storage system, the at least one packet specifying an order in which the units of data should be committed in the second storage system; and (E) committing the units of data in the second storage system in the order specified by the at least one packet of information, independent of the order in which the units of data are received at the second storage system.

42. The method of claim 41, wherein the communication link includes a plurality of parallel communication channels between the first and second storage systems, and wherein step (B) includes a step transmitting the units of data over the plurality of communication channels in an unsynchronized manner so that the units of data are not restricted to transmission in the order in which the units of information are to be committed to the second storage system.

43. The method of claim 41, wherein the at least one packet of information includes a plurality of packets, and wherein step (D) includes steps of:

grouping the units of data transmitted over the communication link into a plurality of consistency groups, each consistency group including a plurality of units of information that should be committed to the second storage system in a specific order so that the consistency group will have a representation in the second storage system that is consistent with a valid representation of the consistency group in the first storage system at some point in time; and transmitting at least one packet of information for each consistency group from the first storage system to the second storage system, the at least one packet for each consistency group specifying the order in which the units of data in the consistency group should be committed in the second storage system.

44. The method of claim 43, further including steps of:

organizing the plurality of storage locations in the first storage system into consistency sets, each consistency set specifying a set of storage locations that should have a representation in the second storage system that is consistent with a valid representation of the set of storage locations in the first storage system at some point in time.

45. The method of claim 44, wherein step (B) includes a step of transmitting the plurality of units of data so that a plurality of consistency groups relating to a single consistency set can be in transit over the communication link simultaneously.

46. The method of claim 45, wherein the communication link includes a plurality of parallel communication channels between the first and second storage systems, and wherein step (D) includes a step transmitting packets relating to consistency groups in different consistency sets in an unsynchronized manner over the plurality of communication channels.

47. The method of claim 46, wherein step (D) includes a step transmitting packets relating to consistency groups in a same consistency set in a synchronized manner, and wherein step (E) includes a step of processing packets of information relating to the same consistency set in the order in which the packets are received at the second storage system, so that consistency groups relating to the same consistency set are committed to the second storage system in an order determined by the order in which their packets are received at the second storage system.

48. A target storage system for use in a computer system including a central processing unit (CPU), a source storage system coupled to the CPU, and a communication link that couples the target storage system to the source storage system, wherein the source storage system transmits over the communication link to the target storage system a plurality of units of data written by the CPU to the source storage system, the target storage system receiving the units of data over the communication link in a first order, the target storage system including:

at least one storage device that includes a plurality of storage locations; and at least one controller that commits the units of data received over the communication link from the source storage system to the at least one storage device in a second order that is independent of the first order in which the units of data are received at the target storage system, wherein the units of data are received without buffering the units of data in a queue to support asynchronous mirroring of the units of data from the source storage system.

49. The target storage system of claim 48, wherein the source storage system transmits at least one packet of information over the communication link to the target storage system, the at least one packet specifying an order in which the units of data should be committed in the target storage system, and wherein the at least one controller includes means for committing the units of data in the target storage system in the order specified by the at least one packet of information, independent of the order in which the units of data are received at the target storage system.

50. A source storage system for use in a computer system including a central processing unit (CPU) coupled to the source storage system, a target storage system, and a communication link that couples the target storage system to the source storage system, wherein the CPU writes a plurality of units of data to the source storage system, the source storage system including:

at least one storage device that includes a plurality of storage locations; and at least one controller that stores the units of data written by the CPU to the at least one storage device and mirrors at least some of the plurality of units of data to the target storage system, wherein the at least one controller does not buffer the at least some of the plurality of units of data in a queue to support asynchronous mirroring to the target storage system, wherein the at least one controller transmits the at least some of the units of data over the communication link to the target storage system in a transmission order, and wherein the at least one controller transmits at least one packet of information over the communication link to the target storage system, the at least one packet specifying a commitment order in which the at least some of the plurality of units of data should be committed in the target storage system independent of the transmission order.

51. The source storage system of claim 50, wherein the controller includes means for generating the at least one packet to specify a committment order that is different than the transmission order.

52. The source storage system of claim 50, wherein the communication link includes a plurality of parallel communication channels between the source and target storage systems, and wherein the at least one controller includes means for transmitting the at least some of the plurality of units of data over the plurality of communication channels in an unsynchronized manner so that the at least some of the plurality of units of data are not restricted to transmission in the order in which the units of information are to be committed to the target storage system.

53. The source storage system of claim 50, wherein the at least one packet of information includes a plurality of packets, and wherein the at least one controller includes:

means for grouping the at least some of the plurality of units of data transmitted over the communication link into a plurality of consistency groups, each consistency group including a plurality of units of information that should be committed to the target storage system in a specific order so that the consistency group will have a representation in the target storage system that is consistent with a valid representation of the consistency group in the source storage system at some point in time; and means for transmitting at least one packet of information for each consistency group from the source storage system to the target storage system, the at least one packet for each consistency group specifying the order in which the units of data in the consistency group should be committed in the target storage system.

54. The source storage system of claim 50, wherein the at least one controller further includes:

means for organizing the plurality of storage locations in the at least one storage device into consistency sets, each consistency set specifying a set of storage locations that should have a representation in the target storage system that is consistent with a valid representation of the set of storage locations in the source storage system at some point in time.

55. The source storage system of claim 54, wherein the at least one controller includes means for transmitting the at least some of the plurality of units of data so that a plurality of consistency groups relating to a single consistency set can be in transit over the communication link simultaneously.

56. The source storage system of claim 55, wherein the communication link includes a plurality of parallel communication channels between the source and target storage systems, and wherein the at least one controller includes means for transmitting packets relating to consistency groups in different consistency sets in an unsynchronized manner over the plurality of communication channels.

57. The source storage system of claim 56, wherein the at least one controller includes means for transmitting packets relating to consistency groups in a same consistency set in a synchronized manner.

58. The source storage system of claim 57, in combination with the target storage system, wherein the target storage system includes means for processing packets of information relating to the same consistency set in the order in which the packets are received at the target storage system, so that consistency groups relating to the same consistency set are committed to the target storage system in an order determined by the order in which their packets are received at the target storage system.

59. In a computer system including a central processing unit (CPU), a first storage system that is coupled to the CPU and includes a plurality of storage locations, a second storage system, and a communication link coupling the second storage system to the first storage system, a method of asynchronously mirroring, to the second storage system, a plurality of units of data written by the CPU to at least some of the plurality of storage locations in the first storage system, wherein the first storage system includes a cache and at least one storage device that includes the plurality of storage locations, the method comprising steps of:

(A) storing a single copy of each of the plurality of units of data directly into the cache without buffering a copy of each unit of data in a queue to support asynchronous mirroring; and (B) asynchronously transmitting each of the plurality of units of data over the communication link from the first storage system to the second storage system.

60. The method of claim 59, wherein the CPU writes each of the plurality of units of data to a destination location among the plurality of storage locations in the first storage system, and wherein step (A) includes a step of, prior to storing one of the plurality of units of data to a cache location corresponding to a destination location in the first storage system, determining whether the destination location stores a previously written unit of data that has not yet been committed in the second storage system.

61. The method of claim 60, wherein step (A) includes a step of, when it is determined that the CPU has attempted a write to a destination location in the first storage system that stores a previously written unit of data that has not yet been committed in the second storage system, informing the CPU that the attempted write cannot currently be processed.

62. The method of claim 60, wherein step (B) includes a step of, when it is determined that the CPU has attempted a write to a destination location in the first storage system that stores a previously written unit of data that has not yet been committed in the second storage system, immediately transmitting the previously written unit of data in the destination location over the communication link from the first storage system to the second storage system.

63. The method of claim 60, wherein step (B) includes, when it is determined that the CPU has attempted a write to a destination location in the first storage system that stores a previously written unit of data that has not yet been committed in the second storage system, steps of:

determining whether the destination location belongs to a consistency set of storage locations that should have a representation in the second storage system that is consistent with a valid representation of the set of storage locations in the first storage system at some point in time; and when the destination location belongs to a consistency set, performing the steps of:

identifying a group of other locations in the consistency set that include previously written units of data that have not yet been transmitted to the second storage system; and immediately transmitting the units of data in the destination location and the group of other locations in the consistency set over the communication link from the first storage system to the second storage system.

64. The method of claim 59, wherein step (B) includes a step of transmitting each of the plurality of units of data over the communication link from the cache to the second storage system.

65. A source storage system for use in a computer system including a central processing unit (CPU) coupled to the source storage system, a target storage system, and a communication link that couples the target storage system to the source storage system, the source storage system including:

at least one storage device that includes a plurality of storage locations;

a cache having a plurality of cache locations that correspond to a subset of the plurality of storage locations; and at least one controller that asynchronously mirrors, to the target storage system, a plurality of units of data written by the CPU to at least some of the plurality of storage locations, wherein the at least one controller stores a single copy of each of the plurality of units of data directly into the cache without buffering a copy of each of the plurality of units of data in a queue to support asynchronous mirroring, and wherein the at least one controller asynchronously transmits each of the plurality of units of data over the communication link from the first storage system to the second storage system.

66. The source storage system of claim 65, wherein the CPU writes each of the plurality of units of data to a destination location among the plurality of storage locations in the source storage system, and wherein the at least one controller includes means for, prior to storing one of the plurality of units of data to a cache location corresponding to a destination location, determining whether the destination location stores a previously written unit of data that has not yet been committed in the target storage system.

67. The source storage system of claim 66, wherein the at least one controller includes means for, when it is determined that the CPU has attempted a write to a destination location in the source storage system that stores a previously written unit of data that has not yet been committed in the target storage system, informing the CPU that the attempted write cannot currently be processed.

68. The source storage system of claim 66, wherein the at least one controller includes means for, when it is determined that the CPU has attempted a write to a destination location in the source storage system that stores a previously written unit of data that has not yet been committed in the target storage system, immediately transmitting the previously written unit of data in the destination location over the communication link from the source storage system to the target storage system.

69. The source storage system of claim 65, wherein the at least one controller includes:

means for, when it is determined that the CPU has attempted a write to a destination location that stores a previously written unit of data that has not yet been committed in the target storage device, determining whether the destination location belongs to a consistency set of storage locations that should have a representation in the target storage device that is consistent with a valid representation of the set of storage locations in the source storage system at some point in time;

means for identifying a group of other locations in the consistency set that include previously written units of data that have not yet been transmitted to the target storage device; and means for immediately transmitting the units of data in the destination location and the group of other locations in the consistency set over the communication link from the source storage system to the target storage device.

70. The source storage system of claim 65, wherein the at least one controller includes means for transmitting each of the plurality of units of data over the communication link from the cache to the target storage system.

71. In a computer system including a central processing unit (CPU), a first storage system that is coupled to the CPU, a second storage system, and a communication link coupling the second storage system to the first storage system, a method of asynchronously mirroring, to the second storage system, a plurality of units of data written by the CPU to at least some of the plurality of storage locations in the first storage system, the method comprising steps of:

(A) organizing the plurality of storage locations into a plurality of consistency sets of storage locations; and (B) asynchronously transmitting the plurality of units of data over the communication link from the first storage system to the second storage system so that each consistency set of storage locations has a representation in the second storage system that is consistent with a valid representation of the consistency set of storage locations in the first storage system at some point in time, wherein the plurality of units of data are asynchronously transmitted without buffering the plurality of units in a queue in the first storage system to support asynchronous mirroring to the second storage system.

72. The method of claim 71, wherein step (B) further includes a step of asynchronously transmitting the plurality of units of data over the communication link from the first storage system to the second storage system so that at least one pair of consistency sets is not guaranteed to have a representation in the second storage system that is consistent with a valid representation of the at least one pair of consistency sets in the first storage system at any point in time.

73. The method of claim 71, wherein step (A) includes a step of organizing the plurality of storage locations into a plurality of consistency sets specified by the CPU.

74. A source storage system for use in a computer system including a central processing unit (CPU) coupled to the source storage system, a target storage system, and a communication link that couples the target storage system to the source storage system, the source storage system including:

at least one storage device that includes a plurality of storage locations; and at least one controller that organizes the plurality of storage locations into a plurality of consistency sets of storage locations and that asynchronously mirrors, to the target storage system, a plurality of units of data written by the CPU to at least some of the plurality of storage locations, wherein the at least one controller asynchronously transmits the plurality of units of data over the communication link from the source storage system to the target storage system so that each consistency set of storage locations has a representation in the target storage system that is consistent with a valid representation of the consistency set of storage locations in the source storage system at some point in time, and wherein the plurality of units of data are transmitted without buffering the plurality of units of data in a queue in the source storage system to support asynchronous mirroring to the target storage system.

75. The source storage system of claim 74, wherein the at least one controller includes means for asynchronously transmitting the plurality of units of data over the communication link from the source storage system to the target storage system so that at least one pair of consistency sets is not guaranteed to have a representation in the target storage system that is consistent with a valid representation of the at least one pair of consistency sets in the source storage system at any point in time.

76. The source storage system of claim 74, wherein the at least one controller includes means for organizing the plurality of storage locations into a plurality of consistency sets specified by the CPU.

77. In a computer system including a central processing unit (CPU), a first storage system coupled to the CPU, a second storage system, and a communication link coupling the second storage system to the first storage system, a method of mirroring, to the second storage system, updates to data stored in the first storage system, the method comprising steps of:

(A) maintaining information indicating that a first update to a first copy of data stored in the first storage system has not been made to a second copy of the data stored in the second storage system, wherein the second copy of the data is an asynchronous mirror of the first copy of the data;

(B) determining when a second update is attempted to the first copy of the data; and (C) transmitting, in response to the step (B), the first update to the second storage system without queuing the first and second updates at the first storage system.

78. The method according to claim 77, wherein the first copy of the data is a logical track of a storage unit associated with the first storage system.

79. The method according to claim 77, wherein the first copy of the data is a logical volume of a storage unit associated with the first storage system.

80. The method according to claim 77, wherein the step (B) comprises a step of determining that a command issued from the CPU is attempting to overwrite the first copy of data.

81. The method according to claim 77, further comprising a step (D) of inhibiting the second update until completion of the step (C).

82. The method according to claim 81, wherein the step (D) comprises disconnecting the first copy of the data to inhibit updates of the first copy.

83. The method according to claim 82, wherein the step (D) comprises indicating, to the first storage system, that additional writes to the first copy of the data should not be sent until the first copy is reconnected.

* * * * *